(12) United States Patent
Sawai

(10) Patent No.: US 8,076,572 B2
(45) Date of Patent: Dec. 13, 2011

(54) WATER STOPPING CONFIGURATION OF LINEAR MEMBERS AND METHOD OF WATER STOPPING THE LINEAR MEMBERS

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 884 days.

(21) Appl. No.: 12/119,017

(22) Filed: May 12, 2008

(65) Prior Publication Data
US 2008/0277607 A1    Nov. 13, 2008

(30) Foreign Application Priority Data

May 11, 2007   (JP) ................................. 2007-126746

(51) Int. Cl.
*H01B 7/288* (2006.01)
(52) U.S. Cl. .................... 174/23 R; 174/20; 174/650
(58) Field of Classification Search .................. 174/650, 174/23 R, 23 C, 20, 77 R, 93; 251/65; 29/861
See application file for complete search history.

(56) References Cited

U.S. PATENT DOCUMENTS

| 5,168,124 A | * | 12/1992 | Takase et al. | 174/23 R |
| 5,536,904 A | * | 7/1996 | Kojima et al. | 174/23 R |
| 5,846,467 A | * | 12/1998 | Saito et al. | 264/263 |

FOREIGN PATENT DOCUMENTS

JP    2005-73389 A    3/2005

* cited by examiner

*Primary Examiner* — Dhirubhai R Patel
(74) *Attorney, Agent, or Firm* — Sughrue Mion, PLLC

(57) ABSTRACT

A water stopping configuration of linear members, includes a liquid water stopping material which is cured after the liquid water stopping material is penetrated into interstices between the linear members bundled together. The water stopping material is a magnetic fluid. The water stopping material is cured in a condition that a magnetic field is applied to the water stopping material from the outside of a covering member which covers an outer periphery of bundled portions of the linear members having the water stopping material penetrated therein so as to gather the water stopping material at a predetermined portion within the covering member.

10 Claims, 6 Drawing Sheets

WATER STOPPING CONFIGURATION OF LINEAR MEMBERS AND METHOD OF WATER STOPPING THE LINEAR MEMBERS

BACKGROUND OF THE INVENTION

The present invention relates to a water stopping configuration of linear members and a method of water stopping the linear members which water stops interstices between wires forming a wire harness, interstices between core wires of a sheathed wire, etc. Incidentally, "water stopping" in the description of the present invention is not limited to the prevention of intrusion of water, but means that it effectively acts on a liquid containing water, oil, alcohol, etc., as a whole, and here description will be made using "water stopping" generally extensively used as a designation.

As a water stopping method of sealing interstices between wires of a wire harness (that is, between linear members forming the wire harness) by a water stopping material, there is known one in which as shown in FIG. 6, the water stopping material 200 is coated onto a plurality of wires W (that is, a bundle of wires W) forming the wire harness, and thereafter a sheet (that is, a covering member) 10 is wound on the coated portion, and then the sheet 10 is temporarily fixed by clips (not shown), and after the water stopping material 200 is cured, the clips are removed from the sheet 10, and this portion of the sheet 10 is covered with a neck portion of a grommet (not shown), and the grommet is fixed to the wire harness (for example, see Patent Literature 1). In this case, a width B of filling of the water stopping material 200 (a length covered by the sheet 10) in the operation is larger than a necessary water stopping width A of the water stopping material 200.

In this method, after the water stopping material 200 is coated, this portion is merely wrapped in the sheet 10, and therefore the water stopping material 200 flows through the interstices between the wires W to the outside of the necessary water stopping width A because of a capillary phenomenon, so that there is a fear that a water stopping performance as expected may not be secured. And besides, there is a fear that projecting portions 201 of the water stopping material 200 projecting to the outside of the sheet 10 may smear the surroundings. The wire harness, in which the water stopping material 200 thus penetrates into the interstices between the wires W and into a gap between the wires W and the sheet 10 such that the projecting portions 201 become large, and thereafter is cured, has a hard portion over a long distance in a direction of its length, and therefore flexibility necessary for the wire harness is lowered.

Next, one example of a water stopping method of sealing interstices between core wires of a sheathed wire (that is, between linear members forming the sheathed wire) by a water stopping material will be described with reference to FIG. 7. As shown in FIG. 7, the sheathed wire 51 has an insulating sheath (that is, a covering member) 54 provided around a plurality of core wires (conductors) 53 thereof. A connection terminal 52 is press-clamped (that is, press-fastened) to an end portion of this sheathed wire 51.

For press-clamping the connection terminal 52 to the sheathed wire 51, the end portion of the sheathed wire 51 where the core wires 53 are exposed by removing the insulating sheath 54 is set between barrels 55 of the connection terminal 52, and the barrels 55 are press-fastened to be closed, thereby fixing the core wires 53 and the insulating sheath 54 to the connection terminal 52 by press-clamping.

In the water stopping method of effecting the water stopping between the core wires 53 of the sheathed wire 51 with the connection terminal 52, a water stopping material having flowability is supplied dropwise to the end portion of the sheathed wire 51 from the upper side (that is, from a forward side when facing FIG. 7) while aiming at a center of a broken-line ellipse 60, and the water stopping material is caused to penetrate into the inside of the insulating sheath 54 in an attempt to fill the interstices between the core wires 53 and a gap between the core wires 53 and an inner surface of the insulating sheath 54 with the water stopping material. Incidentally, an adhesive such as Aron Alpha (registered trademark) produced by Toa Gosei Kabushiki Kaisha is used as the water stopping material.

However, in the water stop processing effected by this method, because of a capillary phenomenon, the water stopping material will not flow uniformly into the interstices between the core wires 53 and into the gap between the core wires 53 and the inner surface of the insulating sheath 54. Therefore, even when a specified amount of water stopping material is supplied dropwise toward the center of the broken-line ellipse 60, there is a high possibility that interstices are formed between the core wires 53 or between the core wires 53 and the insulating sheath 54 (that is, the interstices remain), so that the desired water stopping effect can not be obtained.

Therefore, when a large amount of water stopping material is supplied dropwise toward the center of the broken-line ellipse 60, the water stopping material effectively acts to fill in the interstices, but on the other hand there arises a drawback that the water stopping material penetrates beyond the necessary water stopping width. Namely, the sheathed wire 51, in which the water stopping material penetrates into the interstices between the core wires 53 and into the gap between the core wires 53 and the insulating sheath 54 to an extent exceeding the necessary water stopping width, and then is cured, will have a hard portion over a long distance in the direction of its length, and therefore flexibility necessary for the sheathed wire 51 (that is, the wire harness) becomes low.

Thus, in the water stopping configuration in which it is difficult to confirm how far the water stopping material, caused to penetrate into the interstices between the linear members, has penetrated, a variation in reliability of the water stop processing develops with the above water stopping method.

[Patent Literature 1] JP-A-2005-73389 Publication

SUMMARY

The present invention has been made in view of the above circumstances, and its object is to provide a water stopping configuration of linear members and a method of water stopping the linear members, in which a water stopping material can be retained at a target position, and therefore a sufficient water stopping performance can be achieved, and besides there is no fear that the surroundings may be smeared with the water stopping material.

In order to achieve the above object, a water stopping configuration of linear members according to the present invention has features in the following (1) to (4).

(1) A water stopping configuration of linear members comprises:

a liquid water stopping material which is cured after the liquid water stopping material is penetrated into interstices between the linear members bundled together, wherein the water stopping material is a magnetic fluid; and wherein the water stopping material is cured in a condition that a magnetic field is applied to the water stopping material from the outside of a covering member which covers an outer periphery of bundled portions of the linear members having the water stopping material penetrated therein so as to gather the water stopping material at a predetermined portion within the covering member.

(2) Preferably, the water stopping material is a composite material having a plurality of magnetic ultrafine particles dispersed in a liquid water stopping agent. A surface active agent is chemically adsorbed firmly on a surface of each magnetic ultrafine particle. The liquid water stopping agent is gathered, together with the magnetic ultrafine particles, at the predetermined portion by the magnetic field.

(3) Preferably, the linear members are wires forming a wire harness. The water stopping material is penetrated into the interstices between the wires and a gap between the bundle of the wires and an inner surface of the covering member to be cured.

(4) Preferably, the linear members are core wires forming a sheathed wire. The water stopping material is penetrated into the interstices between the core wires and a gap between the bundle of the core wires and an inner surface of an insulating sheath serving as the covering member to be cured.

In the water stopping configuration of the construction of the above (1), the water stopping agent is gathered at the target position by the use of a magnetic force, and therefore the water stopping performance as designed can be obtained, and besides the projecting of the water stopping material to the outside of the designed range so as to smear the surroundings can be prevented.

In the water stopping configuration of the construction of the above (2), the water stopping agent, gathered together with the magnetic ultrafine particles at the target position by the use of the magnetic force, is cured, and therefore the water stopping performance as designed can be obtained, and besides the projecting of the water stopping material to the outside of the designed range so as to smear the surroundings can be prevented.

In the water stopping configuration of the construction of the above (3), the interstices between the wires forming the wire harness and the gap between the bundle of wires and the inner surface of the covering member are effectively water stopped. Furthermore, in this water stopping configuration, the interstices are water stopped in such a manner that flexibility necessary for the wire harness is not lowered as much as possible. Furthermore, the wires on which magnetic bodies of the water stopping material are gathered as in this water stopping configuration achieve a noise reduction effect upon energization as is the case where ferrite is attached thereto.

In the water stopping configuration of the construction of the above (4), the interstices between the core wires forming the sheathed wire and the gap between the bundle of core wires and the inner surface of the insulating sheath are effectively water stopped. Furthermore, in this water stopping configuration, the interstices are water stopped in such a manner that flexibility necessary for the sheathed wire is not lowered as much as possible. Furthermore, the core wires on which magnetic bodies of the water stopping material are gathered as in this water stopping configuration achieve a noise reduction effect upon energization as is the case with a wire having ferrite attached thereto.

In order to achieve the above object, a method of water stopping linear members according to the present invention has features in the following (5) to 10).

(5) A method of water stopping linear members, comprises:

penetrating a liquid water stopping material into interstices between the linear members bundled together, wherein the water stopping material is a magnetic fluid;

applying a magnetic field to the water stopping material by a magnet from the outside of a covering member which covers an outer periphery of bundle portions of the linear members having the water stopping material penetrated therein so as to gather the water stopping material at a predetermined portion within the covering member; and curing the water stopping material in a condition that the magnetic field is applied to the water stopping material by the magnet.

(6) Preferably, the water stopping material is a composite material having a plurality of magnetic ultrafine particles dispersed in a liquid water stopping agent. A surface active agent is chemically adsorbed firmly on a surface of each magnetic ultrafine particle. The liquid water stopping agent is gathered, together with the magnetic ultrafine particles, at the predetermined portion by the magnetic field.

(7) Preferably, the magnet is an electromagnet. An alternating field is generated by flowing an AC current through a coil of the electromagnet. The water stopping material is gathered at the predetermined portion by the alternating field.

(8) Preferably, the water stopping material includes needle-like magnetic ultrafine particles.

(9) Preferably, the linear members are wires forming a wire harness. The magnetic field is applied by the magnet from the outside of a sheet serving as the covering member and covering an outer periphery of a bundle of the wires in a condition that the water stopping material is penetrated into interstices between the wires to gather the water stopping material at the predetermined portion.

(10) Preferably, the linear members are core wires forming a sheathed wire. The magnetic field is applied by the magnet from the outside of the insulating sheath in a condition that the water stopping material is penetrated into interstices between the core wires and a gap between the bundle of the core wires and an inner surface of an insulating sheath serving as the covering member to gather the water stopping material at the predetermined portion.

In the water stopping method of the above (5), the water stopping material can be gathered at the target position for a necessary time period by the use of the magnet, and can be cured, and therefore the water stopping performance as designed can be obtained, and besides the projecting of the water stopping material to the outside of the designed range so as to smear the surroundings can be effectively prevented.

In the water stopping method of the above (6), the water stopping agent, together with the magnetic ultrafine particles, can be gathered at the target position by the use of the magnet, and can be cured, and therefore the water stopping performance as designed can be obtained, and besides the projecting of the water stopping material to the outside of the designed range so as to smear the surroundings can be effectively prevented.

In the water stopping method of the above (7), by flowing AC current through the coil of the electromagnet, magnetic bodies (magnetic ultrafine particles) in the magnetic fluid (water stopping material) can be continuously moved as fine magnets, and therefore the effect of agitating the water stopping material can be produced, and as a result the water stopping material can be easily filled in the target position. And besides, by flowing AC current through the coil of the electromagnet, IH (electromagnetic induction heating) is effected, and therefore in the case where a thermosetting one is used as the water stopping material, the water stopping material can be efficiently cured.

Furthermore, in the water stopping method of the above (8), by flowing AC current through the coil of the electromagnet, the needle-like magnetic bodies can be continuously changed in orientation, and therefore this is more effective for agitating the water stopping material so as to fill it in the target position.

In the water stopping method of the above (9), the interstices between the wires forming the wire harness and the gap between the bundle of wires and the inner surface of the sheet can be effectively water stopped. Furthermore, in this water stopping method, the interstices can be water stopped in such a manner that flexibility necessary for the wire harness is not lowered as much as possible. Furthermore, the wires on which the magnetic bodies of the water stopping material are thus gathered achieve a noise reduction effect upon energization as is the case where ferrite is attached thereto.

In the water stopping method of the above (10), the interstices between the core wires forming the sheathed wire and the gap between the bundle of core wires and the inner surface of the insulating sheath can be effectively water stopped. Furthermore, in this water stopping method, the interstices are water stopped in such a manner that flexibility necessary for the sheathed wire is not lowered as much as possible. Furthermore, the core wires on which the magnetic bodies of the water stopping material are thus gathered achieve a noise reduction effect upon energization as is the case with a wire having ferrite attached thereto.

In the present invention, the water stopping material can be retained at the target position, and therefore the sufficient water stopping performance can be achieved, and besides there is no fear that the surroundings may be smeared with the water stopping material.

BRIEF DESCRIPTION OF THE DRAWINGS

The present invention has been briefly described above. Details of the present invention will become more manifest upon reading Best Mode for Carrying Out the Invention (described below) with reference to the accompanying drawings.

FIG. 1A is a perspective view, and FIG. 1B is a view for explaining a principle (including a cross-sectional view of a magnet and a perspective view of the inside of a sheet).

FIG. 4A is a perspective view, and FIG. 4B is a view for explaining a principle (including a cross-sectional view of a magnet and a cross-sectional view of an insulating sheath).

DETAILED DESCRIPTION OF EXEMPLARY EMBODIMENTS

Preferred embodiments of the present invention will hereafter be described in detail with reference to the drawings.

First Embodiment

Figure 1A:
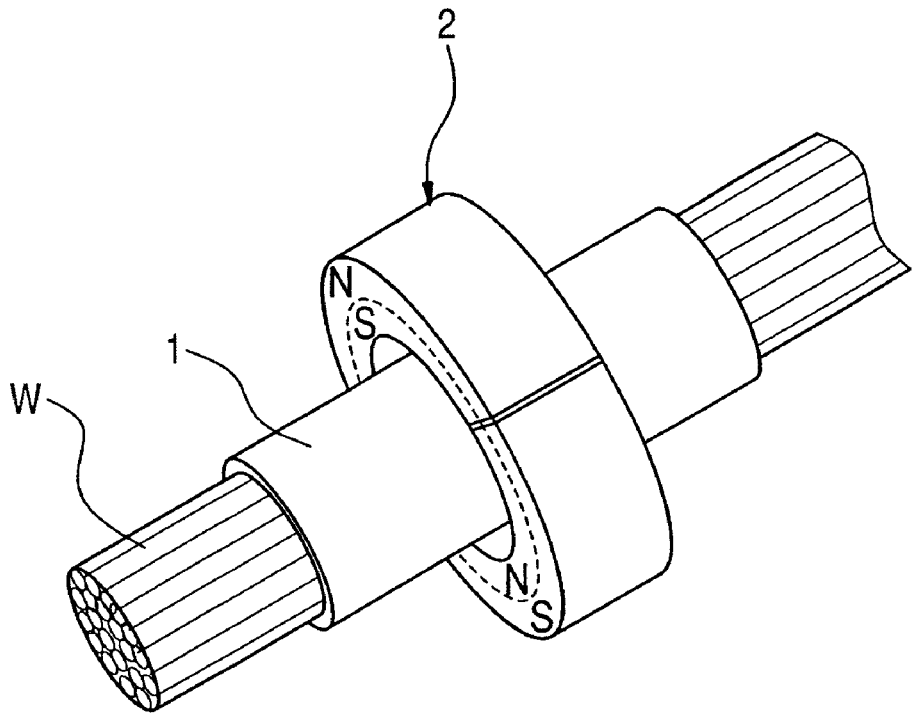
FIG. 1A and FIG. 1B are views showing a condition in which a first embodiment of a water stopping method of the present invention is being performed.
Figure 1B:
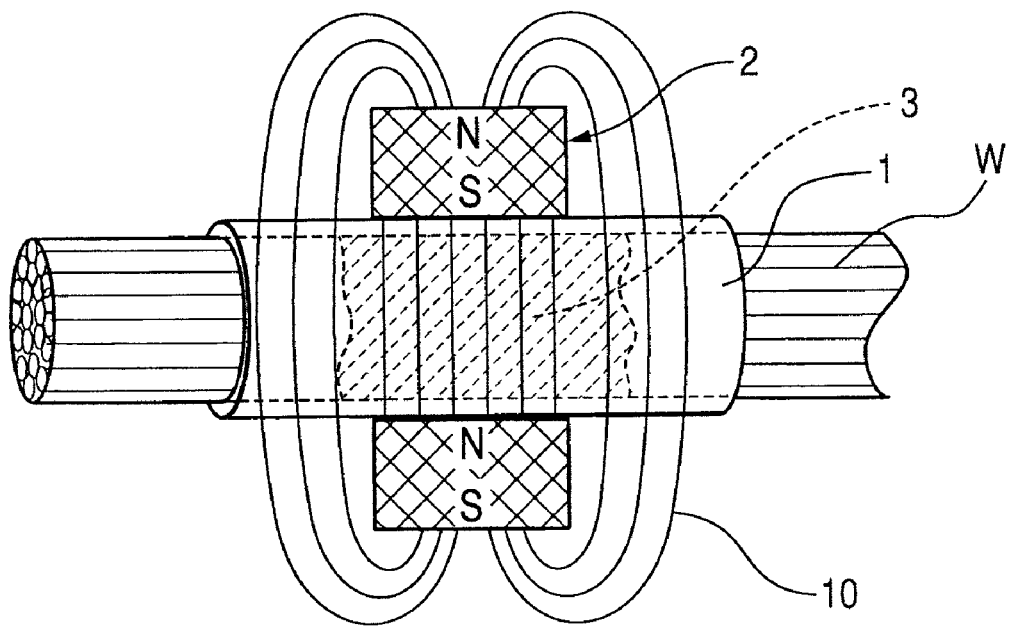

FIG. 1 is a view showing a condition in which a water stopping method of a first embodiment is being performed, and FIG. 1A is a perspective view, and FIG. 1B is a view for explaining a principle (including a cross-sectional view of a magnet and a perspective view of the inside of a sheet).

In the water stopping method of the first embodiment shown in FIG. 1A and FIG. 1B, first, the sheet 1 serving as a covering member, the magnet 2 and a liquid water stopping material 3 are prepared. A non-magnetic resin sheet or the like through which magnetic flux of the magnet 2 can pass and through which the liquid water stopping material 3 will not penetrate is used as the sheet 1. As the magnet 2, there is used a ring-like permanent magnet which is magnetized (magnetized) in a radial direction, and has magnetic poles (north pole and south pole) disposed at each of an outer peripheral side and an inner peripheral side. Incidentally, in this embodiment, although the permanent magnet which can be split into halves is used as the magnet 2, it may be a permanent magnet formed into an integral construction. A magnetic fluid is used as the water stopping material 3. Namely, the water stopping material 3 is one (composite material) in which extremely-microscopic magnetic ultrafine particles (that is, magnetic bodies) are uniformly dispersed in a liquid water stopping agent (that is, a resin such as an adhesive) serving as a base liquid, and a surface active agent is chemically adsorbed firmly on a surface of each magnetic ultrafine particle. Because of vigorous thermal motions and mutually-repulsive forces at surface active agent layers on the surfaces, the magnetic ultrafine particles are kept in a stably-dispersed condition without agglomeration in the water stopping agent. Ferromagnetic ultrafine particles such as magnetite are used as the magnetic ultrafine particles.

Then, the above water stopping material 3 is coated onto that portion of a bundle of wires (In this embodiment, sheathed wires having a conductor made of copper) W (forming a wire harness) which is to be subjected to water stopping, and in a condition in which the water stopping material 3 is caused to penetrate into interstices between the wires W, the sheet 1 is wound on the portion coated with the water stopping material 3. Thereafter, the magnet 2 is put on the outer side of the sheet 1, and a magnetic field is applied to the water stopping material 3 from the outside of the sheet 1. As a result, by the action of lines 10 of magnetic forces as particularly shown in FIG. 1B, the water stopping material 3 is gathered to fill in the interstices between the wires W and a gap between the bundle of wires W and an inner surface of the sheet 1 over a range at which the water stopping material 3 should effect water stopping. Then, while maintaining this condition, the water stopping material 3 is cured. By doing so, there is formed the water stopping configuration of the wire harness, in which the water stopping material 3 is gathered at the predetermined portion within the sheet 1, and is cured in this condition. Incidentally, in this water stopping method, there is adopted the procedure in which first, the water stopping material 3 is coated onto the bundle of wires W, and thereafter the sheet 1 is wound on the portion coated with this water stopping material 3. However, instead of this, there may be adopted a procedure in which first, the sheet 1 is wound on the bundle of wires W, and thereafter the water stopping material 3 is poured to penetrate into the interstices between the wires W and the gap between the bundle of wires W and the inner surface of the sheet 1.

Thus, the water stopping material 3 is gathered at the target position for a necessary time period by the use of the magnet 2, and this water stopping material 3 is cured, and therefore a water stopping performance as designed can be obtained, and besides the projecting of the water stopping material 3 to the outside of the designed range so as to smear the surroundings can be effectively prevented.

Second Embodiment

Figure 2:
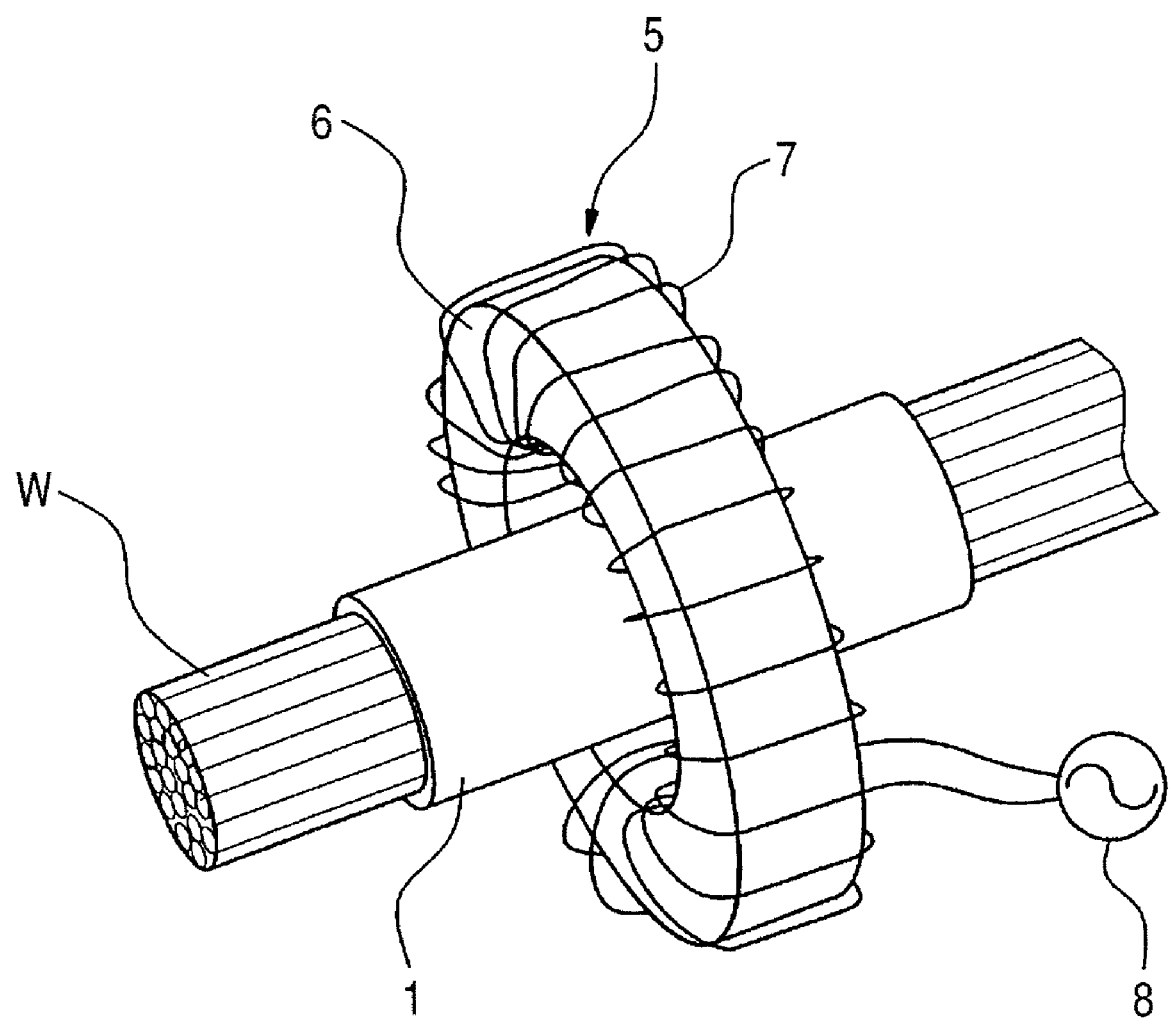
FIG. 2 is a perspective view showing a condition in which a second embodiment of a water stopping method of the present invention is being performed.

Next, a second embodiment will be described using FIG. 2. In the second embodiment, an electromagnet 5 in which a coil 7 is wound on a magnetic core 6 formed into a ring-like integral construction is used as a magnet, and an AC power source 8 is used as a power source for flowing an electric current through the coil 7, and as a water stopping material (not shown), there is used a magnetic fluid in which extremely-microscopic needle-like magnetic ultrafine particles (that is, needle-like magnetic bodies) are uniformly dispersed in a liquid water stopping agent (that is, a resin such as an adhesive) serving as a base liquid. Similarly with the above water stopping material 3, a surface active agent is chemically adsorbed firmly on a surface of each magnetic ultrafine particle of this water stopping material, and because of vigorous thermal motions and mutually-repulsive forces at surface active agent layers on the surfaces, the magnetic ultrafine particles are kept in a stably-dispersed condition without agglomeration in the water stopping agent. The other construction is the same as that of the first embodiment.

In the water stopping method of this embodiment, also, the above water stopping material is coated onto that portion of a bundle of wires W (In this embodiment, sheathed wires having a conductor made of copper) (forming a wire harness) which is to be subjected to water stopping, and in a condition in which the water stopping material is caused to penetrate into interstices between the wires W, a sheet 1 is wound on the portion coated with the water stopping material. Thereafter, the electromagnet 5 is put on the outer side of the sheet 1, and a magnetic field is applied to the water stopping material from the outside of the sheet 1.

At this time, in this embodiment, by flowing an AC current through the coil 7 of the electromagnet 5, an alternating field is generated, and the water stopping material is gathered at the predetermined portion by this alternating field. By doing so, the needle-like magnetic bodies in the magnetic fluid (the water stopping material) not only act as fine magnets, but also are continuously changed in orientation by the alternating field, and therefore the effect of agitating the water stopping material is achieved. Therefore, the water stopping agent of the water stopping material can be easily filled in the target position. Then, by curing the water stopping material while maintaining this condition, there is formed the water stopping configuration of the wire harness in which the water stopping material is gathered at the predetermined portion, and is cured. Therefore, advantages similar to or more than those of the first embodiment can be achieved. Incidentally, in this water stopping method, also, there is adopted the procedure in which first, the water stopping material is coated onto the bundle of wires W, and thereafter the sheet 1 is wound on the portion coated with this water stopping material. However, instead of this, there may be adopted a procedure in which first, the sheet 1 is wound on the bundle of wires W, and thereafter the water stopping material is poured to penetrate into the interstices between the wires W and a gap between the bundle of wires W and the inner surface of the sheet 1.

Figure 3:
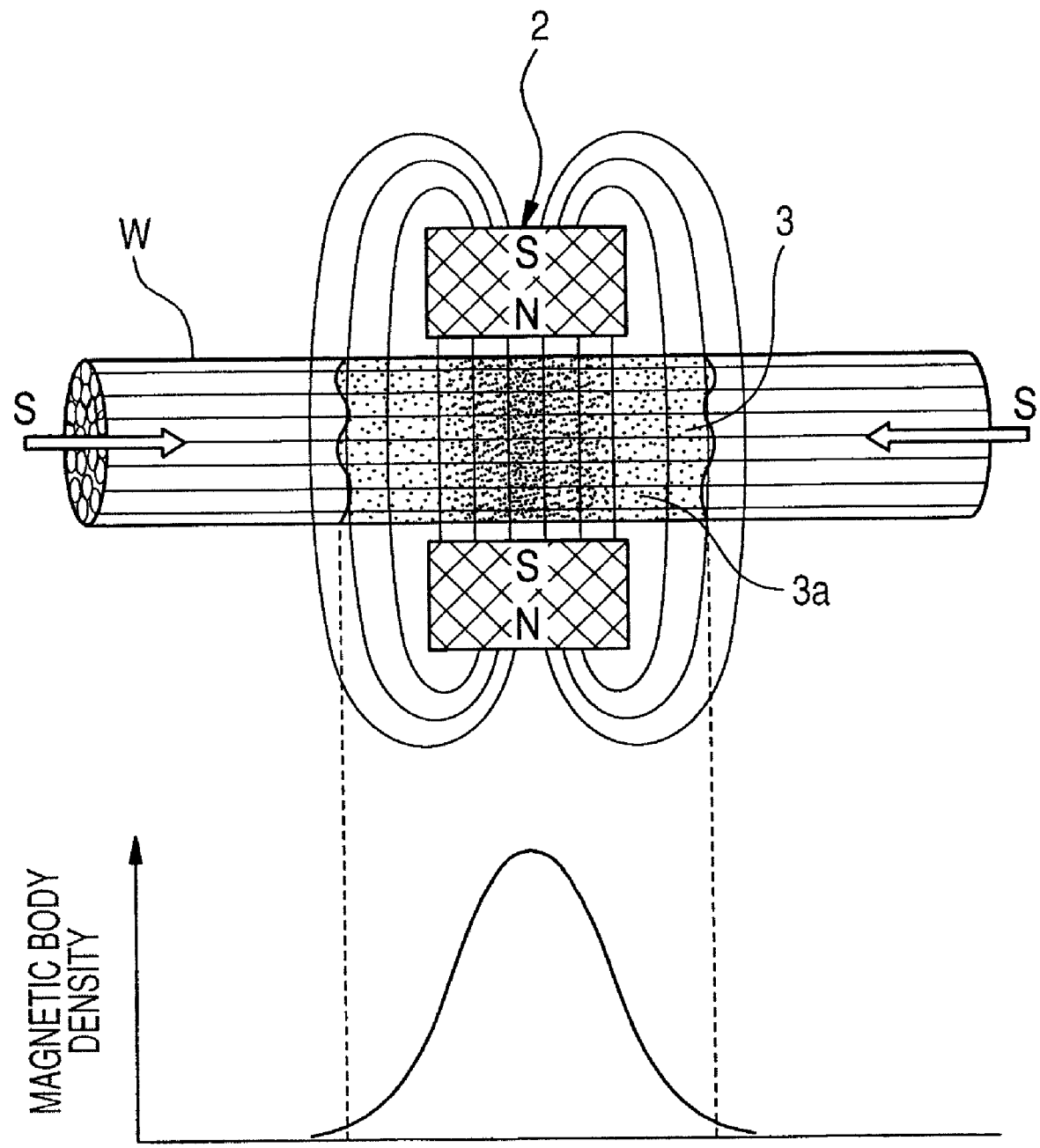
FIG. 3 is a view explanatory of a rust preventive effect.

Incidentally, in the above first embodiment and second embodiment, as the water stopping material having flowability, there is used one having such characteristics that the liquid water stopping agent is moved together with the magnetic ultrafine particles by the magnetic field (in other words, such characteristics that the whole of the liquid water stopping material is moved by the magnetic field as if it had a ferromagnetic property). However, the water stopping material is not limited to this, and the magnetic fluid used as the water stopping material in the present invention may be an inexpensive one in which fine iron powder is merely mixed with a liquid water stopping agent (that is, a resin such as an adhesive). In the case where the magnetic bodies in the magnetic fluid thus have such a nature as to be easily rusted like iron powder, it is usually feared that the magnetic bodies 3a may be rusted by effects of the outside air and moisture S coming in from both sides of the wires W as shown in FIG. 3. However, by distributing the magnetic bodies 3a to be gathered in a larger amount at a central portion of the water stopping material 2 by the action of the magnet 3, the water stopping agent of the water stopping material 3 disposed at the opposite sides shuts off the outside air and the moisture S, and achieve a rust preventive effect.

Incidentally, the present invention is not limited to the above embodiments, and modifications, improvements, etc., can be suitably made. Furthermore, the material, shape, dimensions, number, disposition, etc., of each of the constituent elements of the above embodiments are arbitrary and are not limited in so far as the present invention can be achieved.

In the above first embodiment and second embodiment, description has been made of the examples in which the present invention is applied to the cases where the interstices between the wires (sheathed wires) W forming the wire harness and the gap between the bundle of there wires W and the inner surface of the sheet 1 are sealed by the water stopping material. However, the present invention can be applied to the case where interstices between core wires forming the sheathed wire and a gap between a bundle of these core wires and an inner surface of an insulating sheath around them are sealed by the water stopping material.

Figure 4A:
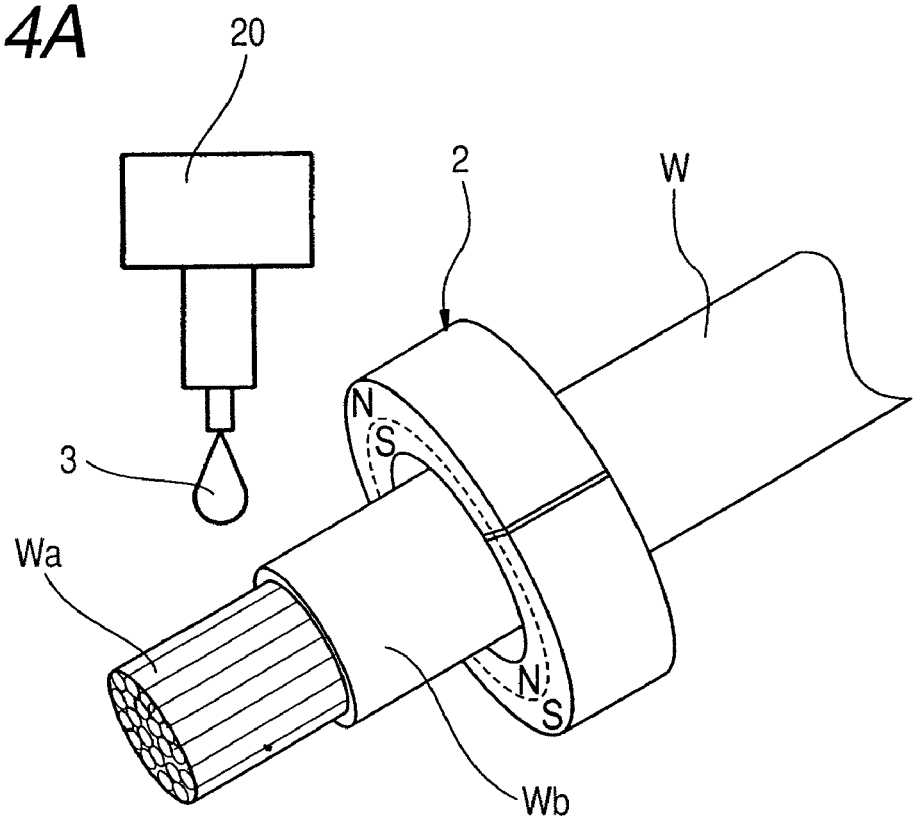
FIG. 4A and FIG. 4B are views showing the manner of performing the water stopping method of the first embodiment relative to one sheathed wire.
Figure 4B:
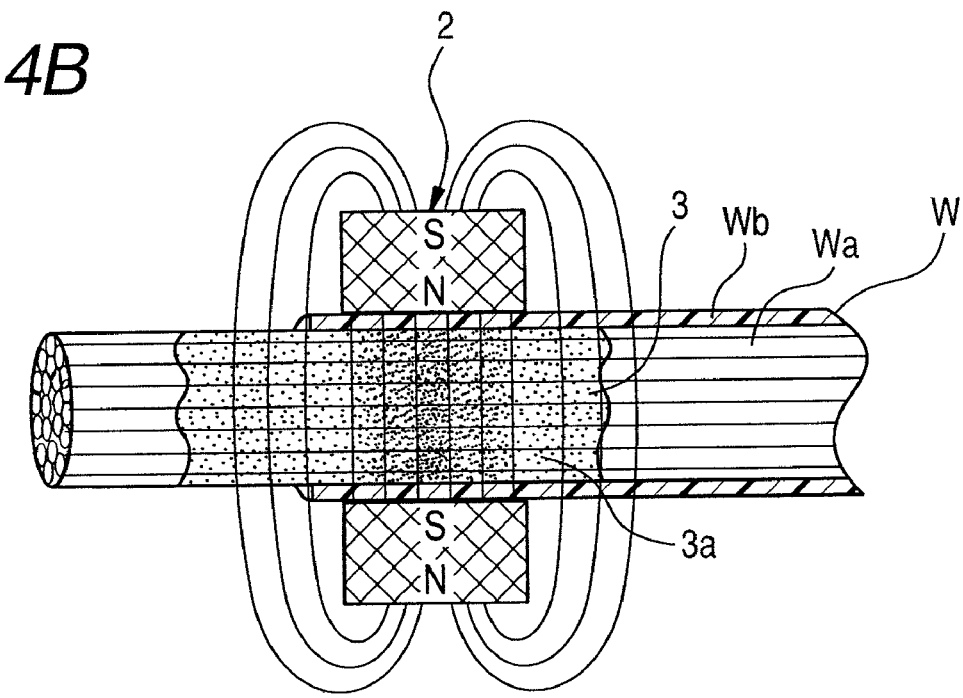

In this case, as is clear, for example, from FIG. 4A and FIG. 4B showing the manner of performing the water stopping method of the above first embodiment relative to one sheathed wire, a water stopping material 3 is supplied from a water stopping material supply device 20 dropwise to exposed portions of copper-made core wires Wa disposed at an end portion of the sheathed wire W, and is caused to penetrate into the inside of an insulating sheath Wb, and thereafter the water stopping material 3 is drawn into a predetermined portion within the insulating sheath Wb by a magnetic field applied from the outside of the insulating sheath Wb by a magnet 2, and is caused to penetrate into interstices between the core wires Wa and a gap between the bundle of these core wires Wa and the inner surface of the insulating sheath Wb.

Figure 5:
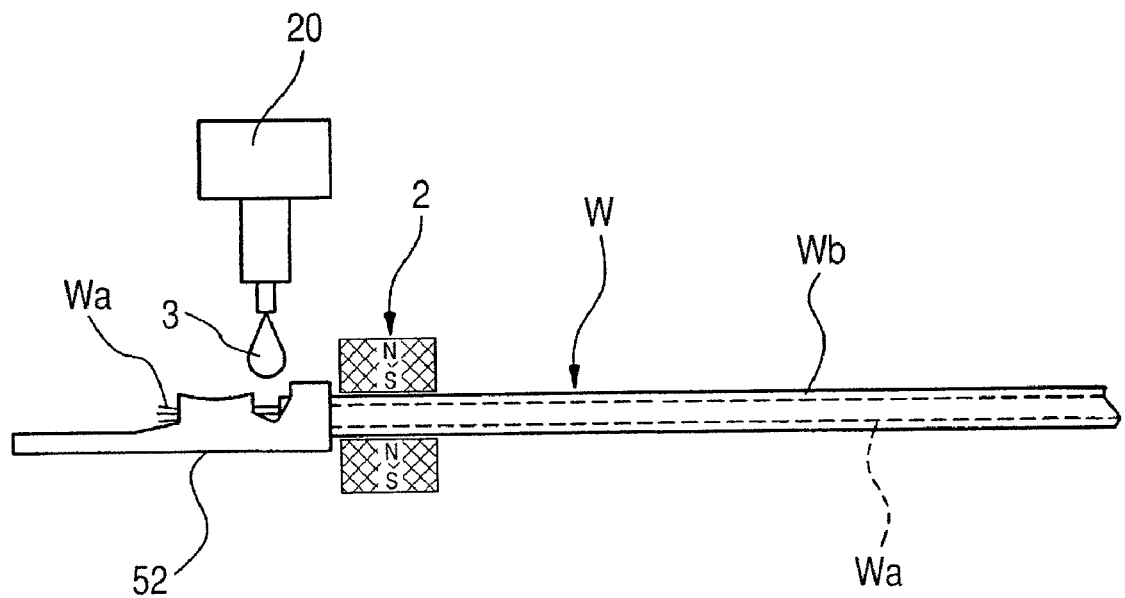
FIG. 5 is a side-elevational view showing the manner of performing the water stopping method of the first embodiment relative to one sheathed wire with a connection terminal.
Figure 6:
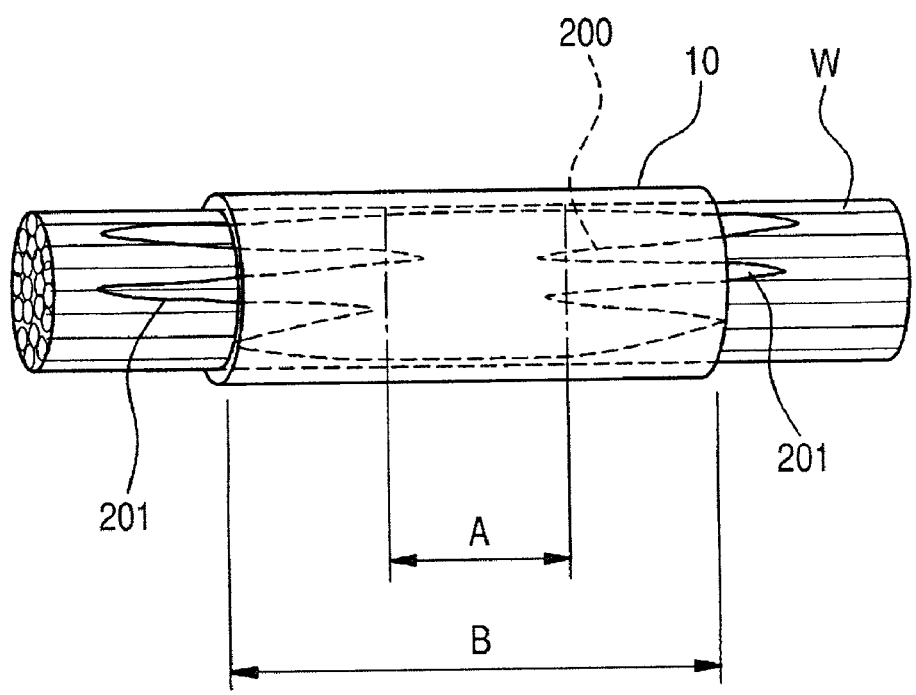
FIG. 6 is a perspective view showing a conventional example.
Figure 7:
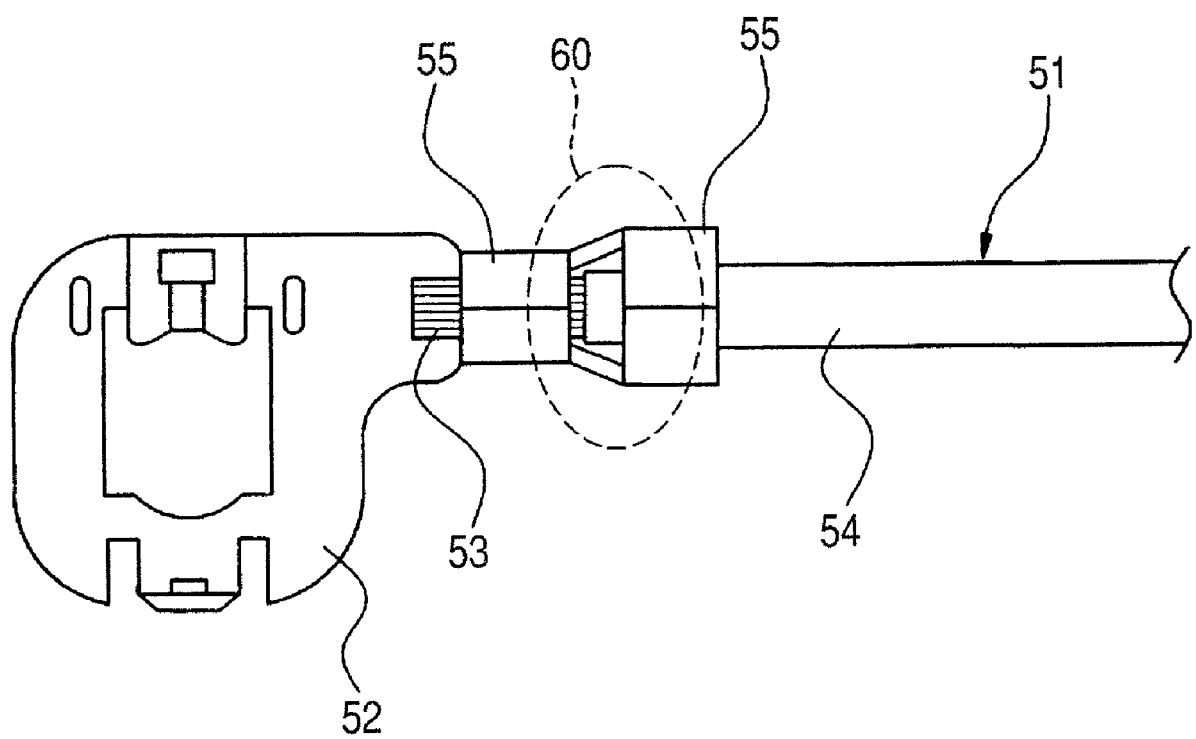
FIG. 7 is a top plan view showing another conventional example.

Incidentally, it is needless to say that similarly with this, the water stopping method of the second embodiment can be performed relative to one sheathed wire. Also, even in the case of the sheathed wire W having the connection terminal 52 secured to its end portion as in the conventional example of FIG. 7, the water stopping method of the first embodiment can be applied as shown in FIG. 5 in a similar manner to the example of FIGS. 4A and 4B. The water stopping method of the second embodiment may, of course, be performed relative to the sheathed wire W provided with this connection terminal 52.

In the above water stopping method, when at least one of the magnet (electromagnet) and the wires is finely vibrated, the magnetic bodies in the water stopping material can easily move, and therefore this is preferred. In this case, with respect to the second embodiment, instead of the AC power source, a DC power source may be used as the power source for flowing an electric current through the coil of the electromagnet.

Incidentally, referring to the magnet, for example, the ring-shaped magnet constructed such that it can be divided into two sections, three sections, four sections, etc., is preferred. Such a dividable magnet can be easily arranged around the linear members, and therefore is preferred. For example, in the case of the magnet constructed such that it can be divided into halves, when conforming to the arrangement of the magnetic poles (north pole and south pole) of the illustrated magnet, an outer peripheral portion of a first semi-circular arc portion of the magnet serves as a north pole, while an inner peripheral portion serves as a south pole, and an outer peripheral portion of a second semi-circular arc portion of the magnet serves as a south pole, while an inner peripheral portion serves as a north pole. Incidentally, in the ring-shaped magnet in which the north pole and the south pole are thus disposed in opposed positions at the inner peripheral portion, magnetic flux passing through the linear members increases, and therefore this is preferred.

However, the arrangement of the magnetic poles (north pole and south pole) is not limited to the illustrated arrangement, and any arrangement may be acceptable in so far as it can gather the water stopping material at the predetermined portion. Also, the shape of the magnet is not limited to the ring-shape, and any shape may be acceptable in so far as it can gather the water stopping material at the predetermined portion. However, the ring-shaped magnet can easily apply a magnetic field in a concentrated manner to the linear members (having the water stopping material penetrated therein) from the periphery thereof, and therefore is preferred.

Furthermore, in the water stopping method of the second embodiment, although one containing the needle-like magnetic bodies is used as the water stopping material, the shape of the magnetic body may not be a needle-shape. However, needless to say, from the viewpoint of agitation of the water stopping material, it is preferred to use the needle-like magnetic bodies.

Here, for a deep understanding of the present invention, the water stopping configuration of the linear members according to the above embodiments will be described in a briefly summarized manner.

In the water stopping configuration of the linear members in which after the liquid water stopping material (3) is caused to penetrate into interstices between the plurality of linear members (W) bundled together, the water stopping material (3) is cured, and in this water stopping configuration of the linear members, the magnetic fluid is used as the water stopping material (3), and a magnetic field is applied to the water stopping material (3) from the outside of the covering member (1; Wb) covering the outer periphery of the bundled portions of the linear members (W) having the water stopping material (3) penetrated therein, thereby gathering the water stopping material at a predetermined portion within the covering member (1; Wb), and in this condition the water stopping material (3) is cured. In this water stopping configuration, the water stopping material (3) is gathered at the target position by the use of a magnetic force, and is cured, and therefore the water stopping performance as designed can be obtained, and besides the projecting of the water stopping material (3) to the outside of the designed range so as to smear the surroundings can be prevented.

The water stopping material (3) is a composite material having a plurality of magnetic ultrafine particles dispersed in a liquid water stopping agent, and a surface active agent is chemically adsorbed firmly on a surface of each magnetic ultrafine particle, and the liquid water stopping agent is gathered, together with the magnetic ultrafine particles, at the predetermined portion by the magnetic field. In this water stopping configuration, the water stopping agent, gathered together with the magnetic ultrafine particles at the target position by the use of the magnetic force, is cured, and therefore the water stopping performance as designed can be obtained, and besides the projecting of the water stopping material (3) to the outside of the designed range so as to smear the surroundings can be prevented.

The plurality of linear members are the wires (W) forming the wire harness, and the water stopping material (3) penetrates into interstices between these wires (W) and a gap between the bundle of the wires (W) and the inner surface of the covering member (1), and is cured. In this water stopping configuration, the interstices between the wires (W) forming the wire harness and the gap between the bundle of wires (W) and the inner surface of the covering member (1) are effectively water stopped. Furthermore, in this water stopping configuration, the interstices are water stopped in such a manner that flexibility necessary for the wire harness is not lowered as much as possible. Furthermore, the wires (W) on which the magnetic bodies of the water stopping material (3) are gathered as in this water stopping configuration achieve a noise reduction effect upon energization as is the case where ferrite is attached thereto.

The plurality of linear members are the core wires (Wa) forming the sheathed wire (W), and the water stopping material (3) penetrates into interstices between these core wires (Wa) and a gap between the bundle of the core wires (Wa) and an inner surface of the insulating sheath (Wb) serving as the covering member, and is cured. In this water stopping configuration, the interstices between the core wires (Wa) forming the sheathed wire (W) and the gap between the bundle of core wires (Wa) and the inner surface of the insulating sheath (Wb) are effectively water stopped. Furthermore, in this water stopping configuration, the interstices are water stopped in such a manner that flexibility necessary for the sheathed wire (W) is not lowered as much as possible. Furthermore, the core wires (Wa) on which the magnetic bodies of the water stopping material (3) are gathered as in this water stopping configuration achieve a noise reduction effect upon energization as is the case with a wire having ferrite attached thereto.

Here, for a deep understanding of the present invention, the method of water stopping the linear members according to the above embodiments will be described in a briefly summarized manner.

In the method of water stopping the linear members in which after the liquid water stopping material (3) is caused to penetrate into interstices between the plurality of linear members (W) bundled together, the water stopping material (3) is cured, and in this method of water stopping the linear members, the magnetic fluid is used as the water stopping material (3), and after the water stopping material (3) is caused to penetrate into the interstices between the linear members (W), a magnetic field is applied by means of the magnet (2; 5) from the outside of the covering member (1; Wb) covering the outer periphery of those portions of the bundle of the linear members (W) having the water stopping material (3) penetrated therein, so as to gather the water stopping material (3) at a predetermined portion within the covering member (1; Wb), and in this condition the water stopping material (3) is cured. In this water stopping method, the water stopping material (3) can be gathered at the target position for a necessary time period by the use of the magnet (2; 5), and can be cured, and therefore the water stopping performance as designed can be obtained, and besides the projecting of the water stopping material (3) to the outside of the designed range so as to smear the surroundings can be effectively prevented.

The water stopping material (3) is a composite material having a plurality of magnetic ultrafine particles dispersed in a liquid water stopping agent, and a surface active agent is chemically adsorbed firmly on a surface of each magnetic ultrafine particle, and the liquid water stopping agent is gathered, together with the magnetic ultrafine particles, at the predetermined portion by the magnetic field. In this water stopping method, the water stopping agent, together with the magnetic ultrafine particles, can be gathered at the target position by the use of the magnet (2; 5), and can be cured, and therefore the water stopping performance as designed can be obtained, and besides the projecting of the water stopping material (3) to the outside of the designed range so as to smear the surroundings can be prevented.

The electromagnet (5) is used as the magnet, and an alternating field is generated by flowing an AC current through a coil (7) of the electromagnet (5), and the water stopping material is gathered at the predetermined portion by the alternating field. In this water stopping method, by flowing AC current through the coil (7) of the electromagnet (5), the magnetic bodies (magnetic ultrafine particles) in the magnetic fluid (water stopping material) can be continuously moved as fine magnets, and therefore the effect of agitating the water stopping material can be produced, and as a result the water stopping material can be easily filled in the target position. And besides, by flowing AC current through the coil (7) of the electromagnet (5), IH (electromagnetic induction heating) is effected, and therefore in the case where a thermosetting one is used as the water stopping material, the water stopping material can be efficiently cured. In this embodiment, it is preferred that the water stopping material contain needle-like magnetic ultrafine particles, and in this case, by flowing AC current through the coil of the electromagnet, the needle-like magnetic bodies are continuously changed in orientation, and therefore this is more effective for agitating the water stopping material so as to fill it in the target position.

The plurality of linear members are the wires (W) forming the wire harness, and in a condition in which the water stopping material (3) penetrates into interstices between these wires (W), the magnetic field is applied by the magnet (2; 5) from the outside of the sheet (1) serving as the covering member and fitted on the outer periphery of the bundle of the wires (W), thereby gathering the water stopping material (3) at the predetermined portion. In this water stopping method, the interstices between the wires (W) forming the wire harness and the gap between the bundle of wires (W) and the inner surface of the sheet (1) can be effectively water stopped. Furthermore, in this water stopping method, the interstices can be water stopped in such a manner that flexibility necessary for the wire harness is not lowered as much as possible. Furthermore, the wires (W) on which the magnetic bodies of the water stopping material (3) are thus gathered achieve a noise reduction effect upon energization as is the case where ferrite is attached thereto.

The plurality of linear members are the core wires (Wa) forming the sheathed wire (W), and in a condition in which the water stopping material (3) penetrates into interstices between these core wires (Wa) and a gap between the bundle of the core wires (Wa) and the inner surface of the insulating sheath (Wb) serving as the covering member, a magnetic field is applied by the magnet (2; 5) from the outside of the insulating sheath (Wb), thereby gathering the water stopping material (3) at the predetermined portion. In this water stopping method, the interstices between the core wires (Wa) forming the sheathed wire (W) and the gap between the bundle of core wires (Wa) and the inner surface of the insulating sheath (Wb) can be effectively water stopped. Furthermore, in this water stopping method, the interstices are water stopped in such a manner that flexibility necessary for the sheathed wire (W) is not lowered as much as possible. Furthermore, the core wires (Wa) on which the magnetic bodies of the water stopping material (3) are thus gathered achieve a noise reduction effect upon energization as is the case with a wire having ferrite attached thereto.

What is claimed is:

1. A water stopping configuration of linear members, comprising:
   a liquid water stopping material which is cured after the liquid water stopping material is penetrated into interstices between the linear members bundled together,
   wherein the water stopping material is a magnetic fluid; and
   wherein the water stopping material is cured in a condition that a magnetic field is applied to the water stopping material from an outside of a covering member which covers an outer periphery of bundled portions of the linear members having the water stopping material penetrated therein so as to gather the water stopping material at a predetermined portion within the covering member.

2. The water stopping configuration of linear members according to claim 1, wherein the water stopping material is a composite material having a plurality of magnetic ultrafine particles dispersed in a liquid water stopping agent;
   wherein a surface active agent is chemically adsorbed firmly on a surface of each magnetic ultrafine particle; and
   wherein the liquid water stopping agent is gathered, together with the magnetic ultrafine particles, at the predetermined portion by the magnetic field.

3. The water stopping configuration of linear members according to claim 1, wherein the linear members are wires forming a wire harness; and
   wherein the water stopping material is penetrated into the interstices between the wires and a gap between the bundle of the wires and an inner surface of the covering member to be cured.

4. The water stopping configuration of linear members according to claim 1, wherein the linear members are core wires forming a sheathed wire; and
   wherein the water stopping material is penetrated into the interstices between the core wires and a gap between the bundle of the core wires and an inner surface of an insulating sheath serving as the covering member to be cured.

5. A method of water stopping linear members, comprising:
   penetrating a liquid water stopping material into interstices between the linear members bundled together, wherein the water stopping material is a magnetic fluid;
   applying a magnetic field to the water stopping material by a magnet from an outside of a covering member which covers an outer periphery of bundle portions of the linear members having the water stopping material penetrated therein so as to gather the water stopping material at a predetermined portion within the covering member; and
   curing the water stopping material in a condition that the magnetic field is applied to the water stopping material by the magnet.

6. The method of water stopping linear members according to claim 5, wherein the water stopping material is a composite material having a plurality of magnetic ultrafine particles dispersed in a liquid water stopping agent;

wherein a surface active agent is chemically adsorbed firmly on a surface of each magnetic ultrafine particle; and wherein the liquid water stopping agent is gathered, together with the magnetic ultrafine particles, at the predetermined portion by the magnetic field.

7. The method of water stopping linear members according to claim 5, wherein the magnet is an electromagnet;

wherein an alternating field is generated by flowing an alternating current through a coil of the electromagnet; and wherein the water stopping material is gathered at the predetermined portion by the alternating field.

8. The method of water stopping linear members according to claim 7, wherein the water stopping material includes needle-like magnetic ultrafine particles.

9. The method of water stopping linear members according to claim 5, wherein the linear members are wires forming a wire harness; and wherein the magnetic field is applied by the magnet from the outside of a sheet serving as the covering member and covering an outer periphery of a bundle of the wires in a condition that the water stopping material is penetrated into interstices between the wires to gather the water stopping material at the predetermined portion.

10. The method of water stopping linear members according to claim 5, wherein the linear members are core wires forming a sheathed wire; and wherein the magnetic field is applied by the magnet from the outside of the insulating sheath in a condition that the water stopping material is penetrated into interstices between the core wires and a gap between the bundle of the core wires and an inner surface of an insulating sheath serving as the covering member to gather the water stopping material at the predetermined portion.

* * * * *